US012343899B2

(12) United States Patent
Von Limburg et al.

(10) Patent No.: US 12,343,899 B2
(45) Date of Patent: Jul. 1, 2025

(54) SWITCHABLE MAGNET DEVICE AND SYSTEM, COMPRISING A HOUSING AND A SWITCHABLE MAGNET DEVICE

(71) Applicant: B.T. INNOVATION GMBH, Magdeburg (DE)

(72) Inventors: Felix Von Limburg, Magdeburg (DE); Bernd Schreyer, Reilingen (DE)

(73) Assignee: B.T. innovation GmbH, Magdeburg (DE)

(*) Notice: Subject to any disclaimer, the term of this patent is extended or adjusted under 35 U.S.C. 154(b) by 230 days.

(21) Appl. No.: 18/248,132

(22) PCT Filed: Oct. 8, 2021

(86) PCT No.: PCT/EP2021/077892

§ 371 (c)(1),
(2) Date: Apr. 6, 2023

(87) PCT Pub. No.: WO2022/074213

PCT Pub. Date: Apr. 14, 2022

(65) Prior Publication Data

US 2023/0364826 A1 Nov. 16, 2023

(30) Foreign Application Priority Data

Oct. 9, 2020 (DE) .................... 10 2020 126 483.6

(51) Int. Cl.
*B28B 7/00* (2006.01)

(52) U.S. Cl.
CPC .................................. *B28B 7/002* (2013.01)

(58) Field of Classification Search
CPC .............................. B28B 7/0017; B28B 7/002
See application file for complete search history.

(56) References Cited

U.S. PATENT DOCUMENTS 6,082,701 A 7/2000 Reymann
6,168,221 B1 1/2001 Carruth et al.
(Continued)

FOREIGN PATENT DOCUMENTS

CN 108673713 A 10/2018
CN 210282654 U 4/2020
(Continued)

OTHER PUBLICATIONS

Office Action, with English translation, issued in corresponding European Application No. 21 791 295.5, dated Oct. 15, 2024 (22 pages).
(Continued)

*Primary Examiner* — James Sanders
(74) *Attorney, Agent, or Firm* — FLYNN THIEL, P.C.

(57) ABSTRACT

Switchable magnet device, comprising: at least one magnet stack that is transferable between an interaction position in which the magnet stack is magnetically functionally connected to the formwork support, preferably to a magnetisable formwork support, preferably by contact with the formwork support, and a release position in which the magnetic functional connection between the formwork support and the magnet stack is reduced, preferably canceled. For simple lifting of the magnet device, the magnet device furthermore comprises a fluid-driven energy transmission mechanism that is coupled to the at least one magnet stack in order to transmit a force to the at least one magnet stack for at least partially transferring the at least one magnet stack from the interaction position into the release position.

17 Claims, 2 Drawing Sheets

(56) References Cited

U.S. PATENT DOCUMENTS

| | | | |
|---|---|---|---|
| 6,434,894 B2 | 8/2002 | Reymann | |
| 2005/0012579 A1 | 1/2005 | Underwood et al. | |
| 2013/0343839 A1 | 12/2013 | Voser et al. | |
| 2021/0008759 A1 | 1/2021 | Stofner et al. | |

FOREIGN PATENT DOCUMENTS

| | | | |
|---|---|---|---|
| DE | 4129368 | C2 | 3/1993 |
| DE | 29920866 | U1 | 3/2000 |
| DE | 10038757 | A1 | 2/2002 |
| DE | 10107825 | A1 | 9/2002 |
| DE | 10 2018 212 422 | A1 | 1/2020 |
| DE | 102019200400 | A1 | 7/2020 |
| EP | 0842339 | B1 | 5/1998 |
| EP | 1273407 | A1 | 1/2003 |
| EP | 2527119 | A2 | 11/2012 |
| JP | 2003-291123 | A | 10/2003 |
| SU | 1527123 | A2 | 12/1989 |
| SU | 1557053 | A1 | 4/1990 |
| WO | 2019/170477 | A2 | 9/2019 |

OTHER PUBLICATIONS

International Search Report, with English translation, issued in corresponding International Application No. PCT/EP2021/077892, date of mailing Jan. 18, 2022 (7 pages).

Written Opinion of the International Searching Authority issued in corresponding International Application No. PCT/EP2021/077892, date of mailing Jan. 18, 2022 (7 pages).

Office Action issued in corresponding German Application No. 10 2020 126 483.6, dated Jul. 21, 2021 (5 pages).

Office Action, with English translation, issued in corresponding Chinese Application No. 202180081665.8, dated Mar. 26, 2025 (15 pages).

SWITCHABLE MAGNET DEVICE AND SYSTEM, COMPRISING A HOUSING AND A SWITCHABLE MAGNET DEVICE

The present invention relates to a switchable magnet device and a system, comprising a housing and a switchable magnet device.

From Utility Model Specification DE 29 920 866 U1, a switchable magnet device is known. Therein, the switchable magnet device is a magnet device for fixing a formwork element for precast concrete parts on a base plate. Therein, a magnet is transferable between a lowered position in which it rests upon the base plate and the position of the formwork element is fixed by magnetic interaction of the magnet with the base plate, and a lifted position in which the formwork element is movable due to reduced magnetic interaction. For the transfer into the lifted position, a threaded rod is screwed into the magnet, a sleeve with a head being located at the end of the threaded rod under which elements can grip.

In order to lift the magnet, however, large forces are required to overcome the magnetic interaction. For this reason, the magnet can only be lifted from the base plate with a tool, such as a lever, that is placed at the head.

The present invention was developed in view of the above-mentioned problem, and the object of the invention is to provide a switchable magnet device that is easy to operate and by which the expenditure of force of a user for lifting a magnet from a formwork support can be reduced.

This object is achieved by a switchable magnet device having preferred embodiments described herein.

According to one aspect, a switchable magnet device comprises at least one magnet stack that is transferable between an interaction position in which the magnet stack is preferably in a magnetic functional connection with the formwork support, preferably by contact with the formwork support, and a release position in which the magnetic functional connection between the formwork support and the magnet stack is reduced, preferably canceled. The magnet device furthermore comprises a fluid-driven energy transmission mechanism that is coupled to the at least one magnet stack in order to transmit a force to the at least one magnet stack for at least partially transferring the at least one magnet stack from the interaction position into the release position.

Accordingly, the switchable magnet device includes the fluid-driven energy transmission mechanism. By the energy transmission mechanism being operated by a fluid, energy can be reliably transmitted with high efficiency. Thus, a lifting force that counteracts a magnetic force acting on the magnet stack due to the magnetic interaction with the formwork support can be reliably applied to the at least one magnet stack by the energy transmission mechanism. This force can at least partially support the transfer of the magnet stack, preferably, however, cause it completely with a sufficiently large force. In particular, the fluid-driven energy transmission mechanism can also act as a force conversion mechanism. Here, a small operating force of the energy transmission mechanism that is applied by a user can be converted into a relatively larger lifting force. Thus, the operability of the magnet device is facilitated. In particular, on an operating side of the energy transmission mechanism, a relatively small operating force can be applied over a relatively long distance, while a relatively large lifting force acts on a magnet stack side of the energy transmission mechanism over a relatively short distance. This is advantageous in particular when magnet stacks are employed since the magnetic force already massively decreases at a small distance from the formwork support, thus facilitating the further removal from the formwork support.

Preferably, the fluid-driven energy transmission mechanism is a hydraulic mechanism.

Here, hydraulic liquids which are incompressible are employed in the energy transmission mechanism. This ensures a reliable energy transmission from the operating side to the magnet stack side of the energy transmission mechanism and thus facilitates operability.

According to a further aspect, the energy transmission mechanism can comprise at least one pressure application means, preferably at least one pump cylinder, for the energy input into the fluid of the energy transmission mechanism.

By the pressure application means, the energy that is required to transfer the at least one magnet stack into the release position can be reliably input into the energy transmission mechanism by pressure. In particular, by the pressure application means, the lifting force acting on the at least one magnet stack can be controlled at the operating side.

The pressure application means is, for example, a linear actuator and/or preferably comprises a fixed section and a movable section. Thereby, an operating force can be easily applied by operating the movable section.

Furthermore, the magnet device can comprise a lever means coupled to the pressure application means, in particular the movable section thereof. Preferably, the lever means is coupled to the movable section such that an operating force can be applied in a spaced apart manner from the axis of a direction of motion of the movable section, preferably an axis of the linear actuator. The lever means preferably extends further away from a center of rotation than the axis of the direction of motion of the movable section is arranged. The coupling is preferably effected in such a way that a rotation of the lever means permits a linear movement of the movable section. Thus, a large operating force can be easily applied.

According to yet a further aspect, the energy transmission mechanism can comprise at least one force transmission means, preferably a pressing cylinder, which is coupled with the at least one magnet stack for force transmission of the force to the at least one magnet stack for at least partially transferring the at least one magnet stack from the interaction position into the release position.

By the energy transmission mechanism being coupled with the at least one magnet stack at the force transmission means, the lifting force can be reliably transmitted to the at least one magnet stack.

In the switchable magnet device, at least one of the following features is preferably provided:

- The force transmission means includes a fixed section and a movable section which is coupled to the at least one magnet stack for transferring the at least one magnet stack between the interaction position and the release position.
- The energy transmission mechanism, in particular the at least one force transmission means, is configured to transfer the at least one magnet stack in a translatory manner, in particular along a direction perpendicular to the formwork support, between the interaction position and the release position.
- The force transmission means is designed as a linear actuator, in particular as the pressing cylinder.
- The force transmission means, preferably a movable and/or a fixed section thereof, is at least partially arranged between the formwork support and an upper edge of the magnet stack, further preferred arranged to overlap the magnet stack, as seen in a direction parallel to the formwork support. Particularly preferred, an overlap region between a movable section and a fixed section of the force transmission means, as seen in a direction parallel to the formwork support, is arranged at least partially between the formwork support and an upper edge of the magnet stack.

A coupling site of a fixed section of the force transmission means is arranged closer to the formwork support than a coupling site to the at least one magnet stack of a movable section of the force transmission means, and/or at least one of the coupling sites is arranged between the formwork support and an upper edge of the magnet stack, and/or at least one of the coupling sites at least partially overlaps the force transmission means along a direction of motion of a movable section of the force transmission means.

The at least one magnet stack includes at least one accommodating section which accommodates at least a portion of the energy transmission mechanism within it. Preferably, the accommodating section extends in parallel to the formwork support, and/or the accommodating section comprises a recess which is particularly preferably arranged on a side of the magnet stack facing the formwork support.

By these features, the switchable magnet device can be designed to be compact.

Preferably, a plurality of the force transmission means are coupled with the at least one magnet stack.

Thus, a lifting force can be transmitted to the magnet stack at various sites of the at least one magnet stack. Thereby, a uniform transfer of the magnet stack from the interaction position into the release position can be ensured. In particular, the risk of torques occurring and acting on the magnet stack can be reduced.

Preferably, the energy transmission mechanism furthermore includes a fluid storage means which is coupled with the pressure application means and/or the force transmission means in fluid communication.

By the fluid storage means, a better control of the amount of fluid in the energy transmission mechanism can be achieved. Furthermore, the pressure application means can, for example, repeatedly apply the pressure by providing fluid from the fluid storage means. Moreover, the energy transmission mechanism can be protected from damages by discharging fluid to the fluid storage means, for example in case of excessive pressure in the force transmission means.

According to yet a further aspect, the energy transmission mechanism can furthermore comprise a valve means which is arranged to prevent a transfer of the at least one magnet stack towards the interaction position.

Thereby, the at least one magnet stack can be reliably held in the interaction position. Thus, further elements for holding the magnet stack in the interaction position are superfluous thus facilitating the configuration. In its most simple form, the valve means can contain, for example, a check valve which prevents, when pressure is released on the operating side, fluid from flowing back from the magnet stack side to the operating side. The valve means, however, can also include a multi-way valve, for example.

According to yet a further aspect, the fluid-driven energy transmission mechanism can be coupled to a plurality of magnet stacks.

If large magnetic forces are required to fix a formwork in its position, a plurality of magnet stacks are usually provided. While according to prior art, each magnet stack has to be lifted individually with a tool, according to this aspect, a plurality of magnets can be simultaneously lifted by the energy transmission mechanism. Thus, time for the arrangement of the formworks can be saved and the configuration can be facilitated.

Preferably, the plurality of magnet stacks are arranged in parallel with respect to the fluid-driven energy transmission mechanism.

Here, the plurality of magnet stacks can be reliably and uniformly lifted, in particular with the same pressure. Furthermore, malfunctions in individual fluid branches cannot hazard the function of other fluid branches, so that individual magnet stacks can be reliably lifted.

According to yet a further aspect, the magnet device can furthermore comprise a magnet stack activation means which is couplable with the at least one magnet stack at least for a transfer from the release position into the interaction position.

By a magnet stack activation means provided separately from the energy transmission mechanism, a user can particularly easily activate the at least one magnet stack, that means transfer it into the interaction position. Simultaneously, the energy transmission mechanism can be transferred to a starting position for the next switching operation.

According to yet a further aspect, the magnet device can furthermore comprise at least one release support means which is configured to support a transfer of the at least one magnet stack into the release position, wherein the release support means preferably includes at least one elastic element, particularly preferred a spring element, which is preferably coupled at one end side to the at least one magnet stack, and at the other end side to a stationary section.

Thus, the operating force to be applied by a user can be further reduced. Thus, an elastic element, such as a pressure spring, can be provided, for example, between the formwork support and the magnet stack. The spring force can here support a movement away from the formwork support. In particular when the magnet stack has been lifted from the formwork support by the energy transmission mechanism, the spring force can overcome the remaining reduced magnetic force.

According to yet a further aspect, a system comprises the switchable magnet device according to one of the preceding aspects and a housing that at least partially receives the switchable magnet device within it, where at least one section of the pressure application means is preferably accessible from outside the housing, particularly preferred arranged outside the housing.

Here, the housing shields the at least one magnet stack which is at least partially arranged inside the housing. This moreover renders the configuration compact. Since at least one section of the pressure application means is accessible from outside the housing, a user can apply pressure onto the fluid in a simple way. This increases the ease of operation.

Preferably, the system comprises at least one limit stop which defines the interaction position independent of the fluid-driven energy transmission mechanism.

In other words, the interaction position is not defined by the energy transmission mechanism. Thus, a loading of the energy transmission mechanism in the interaction position can be avoided. Furthermore, the housing can be reliably pressed against the formwork support.

The present invention will now be described in detail with reference to the enclosed drawings.

Figure 1:
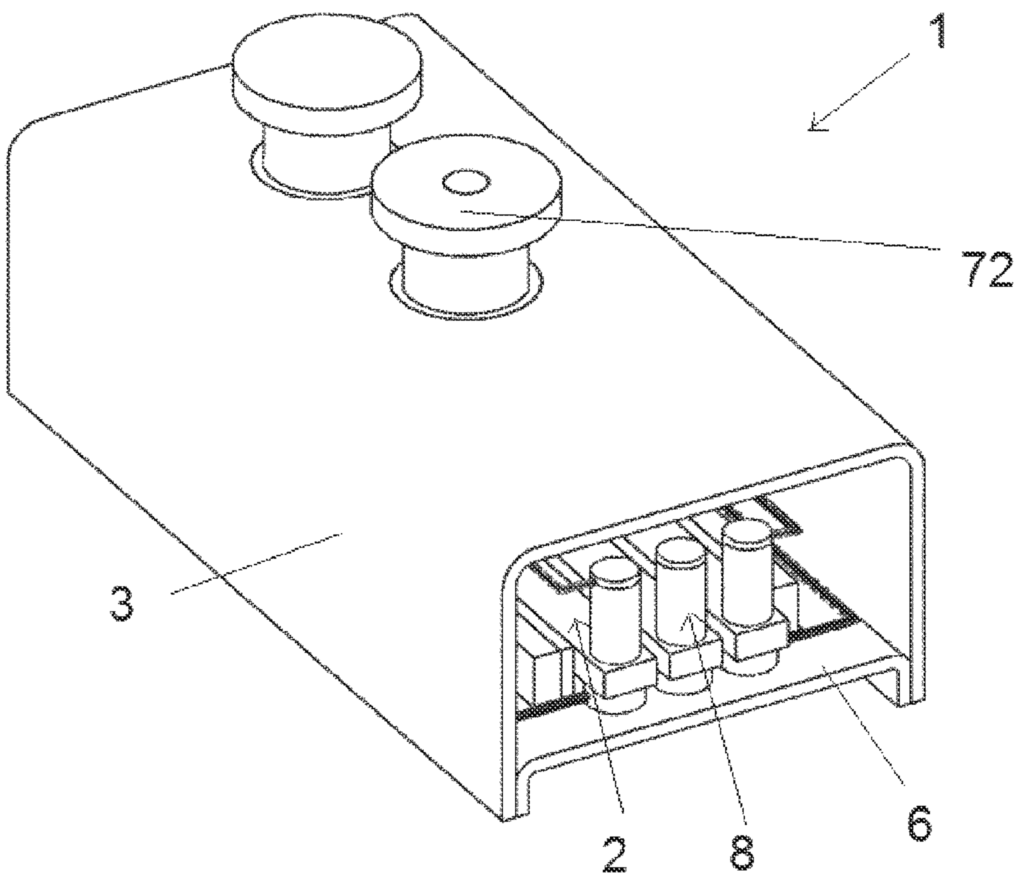
FIG. 1 shows an inventive system with a housing and an inventive magnet device in a perspective view.
Figure 2:
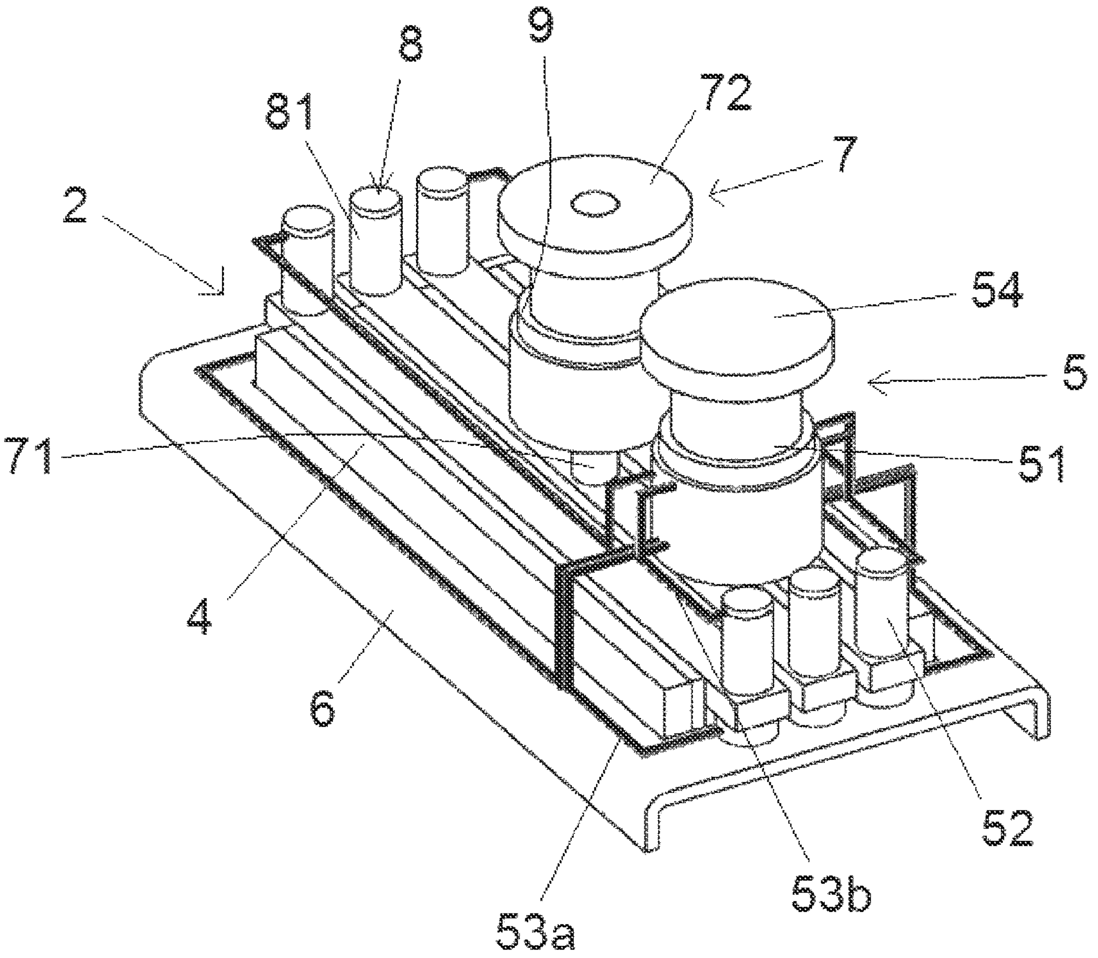
FIG. 2 shows the inventive magnet device of FIG. 1 in a perspective view, wherein the housing is omitted.

FIGS. 1 and 2 show a system 1 including a switchable magnet device 2. The system 1 furthermore includes, as is shown in FIG. 1, a housing 3. The housing 3 is open on both sides in the longitudinal direction and has a C-shaped profile in the cross-section. The housing 3 receives the switchable magnet device 2 inside between the legs of the profile.

In the present embodiment, the magnet device 2 comprises a magnet stack 4 which is transferable between an interaction position, shown in FIG. 2, and a release position. In the interaction position, the magnet stack 4 is in a magnetic functional connection with a magnetisable formwork support, not shown, which can also be part of a system together with the magnet device 2. The formwork support is made of a ferromagnetic material and is thus magnetisable. In the interaction position of the magnet stack 4, there is a magnetic interaction between the formwork support and the magnet stack 4 which applies a force component to the magnet stack 4 in the direction of the formwork support 4.

The magnet stack 4 includes at least one permanent magnet. Preferably, the magnet stack 4 includes, as is represented, a plurality of permanent magnet elements in a plate form which are spaced apart in parallel with respect to each other, and furthermore, ferromagnetic elements arranged therebetween which are preferably formed of a material including steel. As can be seen in FIG. 2, the ferromagnetic elements project each at both end sides from the permanent magnet elements in an extension direction (parallel to the formwork support).

Furthermore, the switchable magnet device 2 includes a hydraulic mechanism 5 which is coupled with the magnet stack 4 to transmit a force to the magnet stack 4 for at least partially transferring the magnet stack 4 from the interaction position into the release position.

The hydraulic mechanism 5 comprises a plurality of linear actuators, that is cylinder elements, in particular a pump cylinder 51, as well as a plurality of pressing cylinders 52, and hydraulic pressure-resistant lines 53*a* and 53*b* which connect the plurality of pressing cylinders 52 with the pump cylinder 51 in fluid communication. As can be seen in FIG. 2, the plurality of pressing cylinders 52 are uniformly arranged with respect to the essentially cuboid-shaped magnet stack 4. Thus, the four pressing cylinders 52, more exactly the coupling sites of the respective pressing cylinders 52 with the magnet stack 4, are substantially arranged close to the corners of the cuboid-shaped magnet stack 4. The coupling sites are in particular arranged uniformly about the center of gravity of the magnet stack 4. The pressing cylinders 52 are coupled with the magnet stack 4 at the ferromagnetic elements.

Both the pump cylinder 51 and the pressing cylinders 52 have a fixed section and a movable section.

The fixed section of the pump cylinder 51 is connected with the housing 3 or arranged thereat in a force, form or material bond. The movable section is provided to be movable with respect to the fixed section and is, for example, a piston. The movable section can be operated by a user.

The respective fixed section of the pressing cylinders 52 is connected with a stationary section 6 of the system 1 or arranged thereat in a force, form or material bond. The stationary section 6 is here a construction plate which is bent downwards at both longitudinal ends and stands on the formwork support with the bent sections and is part of the housing, as can be seen in FIG. 1. The fixed section is thus directly or indirectly coupled to the formwork support. The respective movable section of the pressing cylinders 52 is provided to be movable with respect to the fixed section and comprises, for example, a piston. The movable section is coupled to the magnet stack 4 or arranged thereat in a force, form or material bond, preferably by form bond, wherein the magnet stack 4 rests on the movable section. Here, the coupling site of the movable section to the magnet stack 4 overlaps the pressing cylinder 52 along a direction of motion of the movable section.

The fixed section and the movable section of the pressing cylinders 52 are each at least partially arranged between an upper edge of the magnet stack 4 and the formwork support, as seen in a direction perpendicular to the formwork support. The fixed section and the movable section are arranged in an overlapping manner with the magnet stack 4, as seen in a direction parallel to the formwork support or perpendicular to the direction of motion, respectively.

The movable section is at least partially movable between two end positions, preferably inside the fixed section, along the linear direction of motion (an axial direction perpendicular to the formwork support). An overlap region, as seen in a direction perpendicular to the direction of motion or parallel to the formwork support, respectively, of the movable section and the fixed section of the pressing cylinder 52 at least one of the two end positions is at least partially arranged between the formwork support and an upper edge of the magnet stack.

The coupling site of the fixed section of the pressing cylinder 52 is arranged closer to the formwork support than the coupling site to the at least one magnet stack 4 of the movable section.

In the pump cylinder 51 and the pressing cylinders 52, the fixed section is respectively divided into two spaces by the movable section. In the present case, both spaces each are filled with hydraulic oil both in the pump cylinder 51 and in the pressing cylinders 52. Thus, all hydraulic cylinders are cylinders acting on both sides.

One space each of the pressing cylinders 52 is connected with a space of the pump cylinder 51 via the lines 53*a*. The respective other space of the pressing cylinders 52 is connected with the other space of the pump cylinder 51 via the lines 53*b*. Thus, the pressing cylinders 52 are connected in parallel in the hydraulic mechanism 5.

Furthermore, the magnet device 2 comprises a magnet activation means 7 which includes a threaded rod 71 which is screwed into the magnet stack 4. At the upper end of the threaded rod 71, there is a knob 72 which can be operated by a user.

Furthermore, the magnet device 2 comprises a release support means 8. The release support means 8 comprises a substantially hollow-cylindrical element 81 which is coupled with the magnet stack 4 and in the interior of which there is a spring element which is coupled to the stationary section at its lower end side, and is coupled to the upper side of the cylindrical element 81 at its upper end side, so that a force is transmitted from the spring element to the cylindrical element 81 and thereby to the magnet stack 4 which counteracts a magnetic force and thereby supports the transfer of the magnet stack 4 into the release position.

The function of the above construction will now be described hereinafter.

The switchable magnet device 2 comprises at least one magnet stack 4 that is transferable between an interaction position in which the magnet stack 4 is magnetically functionally connected to the formwork support, and a release position in which the magnetic functional connection between the formwork support and the magnet stack 4 is reduced. The magnet device 2 furthermore comprises a fluid-driven energy transmission mechanism, here the hydraulic mechanism 5, that is coupled to the at least one magnet stack 4 in order to transmit a force to the at least one magnet stack 4 for at least partially transferring the at least one magnet stack 4 from the interaction position into the release position.

A user can press down the movable section (piston) of the pump cylinder 51 from the starting position on the operating side. In the process, pressure is applied to the fluid between the respective spaces of the pressing cylinders 52 and the one space of the pump cylinder 51 which are connected via the lines 53*a*, the pressure transmitting a force via the movable section of the pressing cylinders 52 to the magnet stack 4 which is directed away from the formwork support in a direction perpendicular to the formwork support. Thus, the respective spaces of the pressing cylinders 52 and the one space of the pump cylinder 51 which are connected via the lines 52*a* form an operating hydraulic path via which a lifting force is transmitted to the at least one magnet stack 4 for at least partially transferring the at least one magnet stack 4 from the interaction position into the release position.

The respective spaces of the pressing cylinders 52 and the one space of the pump cylinder 51 which are connected via the lines 53*b* form a tracking hydraulic path via which the fluid tracks the movable section of the pump cylinder 51 by the pressure of the movable section of the pressing cylinders 52.

Preferably, the overall cross-sectional area of the movable sections of the pressing cylinders 52 which is in contact with the fluid is larger than the cross-sectional area of the movable section of the pump cylinder 51 which is in contact with the fluid. Here, the hydraulic mechanism acts as a force conversion mechanism. Here, a small operating force of the energy transmission mechanism that is applied by a user can be converted into a relatively larger lifting force. Thus, the operability of the magnet device is facilitated. In particular, on an operating side of the energy transmission mechanism, a relatively small operating force can be applied over a relatively long distance, while a relatively large lifting force acts on a magnet stack side of the energy transmission mechanism over a relatively short distance. This is advantageous in particular when magnet stacks are employed since the magnetic force already massively decreases with a small distance from the formwork support, thus facilitating the further removal from the formwork support.

The fluid-driven energy transmission mechanism is here the hydraulic mechanism.

Here, hydraulic liquids which are incompressible are employed in the energy transmission mechanism. This ensures a reliable energy transmission from the operating side to the magnet stack side of the energy transmission mechanism and thus facilitates operability.

Furthermore, the energy transmission mechanism 5 includes the pump cylinder 51 as a pressure application means for the energy input into the fluid of the energy transmission mechanism.

By the pump cylinder 51, pressure can be reliably input to the fluid and thus energy that is required to transfer the magnet stack 4 into the release position can be input into the energy transmission mechanism. A user can still operate the movable section of the pump cylinder manually or with a tool and thereby control the pressure application.

Furthermore, the energy transmission mechanism 5 includes the pressing cylinders 52 as force transmission means which press the magnet stack 4 away from the formwork support. Here, the respective force transmission means is at least partially subjected to pressure by the magnetic force and gravitational force. In particular, at least one overlap region, as seen in the direction of motion and perpendicular thereto, is substantially subjected to pressure between the movable section and the fixed section. The pressing cylinders 52 are coupled with the at least one magnet stack 4 for force transmission of the force on the at least one magnet stack 4 for at least partially transferring the at least one magnet stack 4 from the interaction position into the release position.

The pump cylinder 51, too, is preferably formed as a pressing cylinder.

By the energy transmission mechanism 5 being coupled with the at least one magnet stack 4 at the pressing cylinders 52, in particular the movable sections of the pressing cylinders 52, the lifting force can be reliably transmitted to the at least one magnet stack 4. The force transmission means are preferably coupled to the magnet stack 4 such that they uniformly move together with the magnet stack 4, preferably along the linear direction of motion. Particularly preferred, the movable section of the pressing cylinders 52 is here formed directly, again preferred, integrally with the magnet stack 4.

The force transmission means 52 includes one fixed section and one movable section each which is coupled to the at least one magnet stack 4 for transferring the at least one magnet stack 4 between the interaction position and the release position. Since the movable section is movable with respect to the fixed section along the direction of motion, the transfer between the interaction position and the release position can be simply accomplished along the direction of motion.

The energy transmission mechanism 5 is designed to transfer the at least one magnet stack 4 in a translatory manner, in particular along a direction perpendicular to the formwork support, between the interaction position and the release position. Thereby, the arrangement can be provided in a compact manner, and the magnetic force rapidly decreases.

The force transmission means 52 is designed as a linear actuator, in particular as the pressing cylinder. Thereby, too, a compact arrangement can be provided.

The force transmission means, preferably a movable and/or a fixed section thereof, is at least partially arranged between the formwork support and an upper edge of the magnet stack 4, again preferred at least partially arranged to overlap the magnet stack 4, as seen in a direction perpendicular and/or parallel to the formwork support. In particular, an overlap region of a movable section and a fixed section, as seen in a direction parallel to the formwork support (perpendicular to the direction of motion), of the force transmission means can at least partially be arranged between the formwork support and an upper edge of the magnet stack. Thereby, too, a compact arrangement can be provided.

A coupling site of a fixed section of the force transmission means 52 is arranged closer to the formwork support than a coupling site to the at least one magnet stack 4 of a movable section of the force transmission means. Furthermore, at least the coupling site to the stationary section is arranged between the formwork support and an upper edge of the magnet stack. The coupling site of the movable section to the magnet stack 4 at least partially overlaps the force transmission means along the direction of motion of the movable section of the force transmission means. Thereby, too, a compact arrangement can be provided. The magnet stack 4 has four borings that extend perpendicular to the formwork support and project through the sections of the pressing cylinders 52. Thus, the magnet stack includes a plurality of recesses as a accommodating section for parts of the energy transmission mechanism.

Furthermore, a plurality of the pressing cylinders 52 are coupled with the at least one magnet stack 4.

Thus, a lifting force can be transmitted at various sites of the at least one magnet stack 4 to the magnet stack 4. Thereby, a uniform transfer of the magnet stack from the interaction position into the release position can be ensured. In particular, the risk of torques occurring and acting on the magnet stack can be reduced if the force transmission means are uniformly arranged around the center of gravity of the magnet stack.

The plurality of force transmission means 52 are arranged to be connected in parallel with respect to the fluid-driven energy transmission mechanism 5.

Here, the plurality of force transmission means can reliably transmit a force with the same acting pressure and thus cause a uniform lifting. Furthermore, malfunctions in individual lines of the lines 53*a* and 53*b* between the individual pressing cylinders 52 and the pump cylinder 51 cannot endanger the function of other lines, so that the magnet stack 4 can be reliably lifted.

Furthermore, the magnet device 2 includes a magnet stack activation means in the form of the knob 72 and the threaded rod 71 which is couplable with the at least one magnet stack at least for the transfer from the release position into the interaction position.

Thereby, a user can particularly easily transfer the magnet stack 4 into the interaction position. Simultaneously, the energy transmission mechanism 5 can be transferred into a starting position for the next switching operation. If the movable section of the pump cylinder 51 is in a lowered position in the release position of the magnet stack, a user can exert a pressure force onto the knob 72 which brings the magnet stack 4 into the activation position. Simultaneously, the fluid in the operating hydraulic path drives, caused by the movable sections of the pressing pistons 5, the movable section of the pump cylinder 51 into the starting position for a new switching operation.

Furthermore, the magnet device 2 comprises the two release support means 8 which are configured to support a transfer of the at least one magnet stack 4 into the release position, wherein the release support means 8 include a spring element which is coupled at one end side to the at least one magnet stack 4, and at the other end side to a stationary section 6.

Thus, the operating force to be applied by a user can be further reduced. The spring force can here support a movement away from the formwork support. In particular when the magnet stack 4 has been lifted from the formwork support by the energy transmission mechanism 5, the spring force can overcome the remaining reduced magnetic force.

The system 1 comprises the housing 3 which at least partially receives the switchable magnet device 2 within it, wherein a section of the pressure application means 51, that is the movable section of the pump cylinder 51 which is provided with a knob 54, is arranged outside the housing 3. The housing receives the magnet stack 4, the movable section of the pump cylinder 51, the pressing cylinders 52, and the lines 53*a* and 53*b*, and the release support means 8 each at least partially inside of it and overlaps these parts in a direction perpendicular to the formwork support.

Here, the housing 3 shields the at least one magnet stack 4 which is at least partially arranged inside the housing 3. This renders the configuration compact. Since the knob 54 is accessible from outside the housing, a user can apply pressure on the fluid in a simple way. This increases the ease of operation.

Preferably, the system 1 comprises at least one limit stop which defines the interaction position independent of the fluid-driven energy transmission mechanism. This limit stop can be formed, for example, by the formwork support itself on which the magnet stack 4 rests. However, a limit stop can also be provided at the housing. Thus, the housing includes a bushing 9 at the bottom surface of which the knob 72 can rest and which thus defines the interaction position in a state coupled with the magnet stack 4. In other words, the interaction position is not defined by the energy transmission mechanism. In particular, neither the movable section of the pump cylinder 51 nor those of the pressing cylinders 52 contact a limit stop. Thus, a loading of the energy transmission mechanism 5 in the interaction position can be avoided. Furthermore, the housing 3 can be reliably pressed against the formwork support. This means, in the interaction position, the magnetic force is transmitted to the housing to press the housing against the formwork support.

The housing can be, for example, a housing of a box magnet, or also an integral section of a formwork device.

The parts of the energy transmission mechanism are preferably formed of a non-magnetic material.

MODIFICATIONS OF THE EMBODIMENT

The at least one magnet stack can also include an accommodating section which extends in parallel to the formwork support. Here, a recess can be arranged on the side of the magnet pack facing the formwork support. Thus, the recess can be provided depressed from a surface facing the formwork support. In other words, the accommodating section is located between an upper edge of the magnet stack and the formwork support.

For example, a portion of the lines 53*a* and 53*b* can be arranged in the accommodating section. Thus, the arrangement becomes particularly space-saving. The accommodating section is preferably formed at least in the interaction position of the magnet stack 4 and receives portions of the energy transmission mechanism. Preferably, the accommodating section here at least partially overlaps portions of the energy transmission mechanism, as seen in a direction parallel to the formwork support and perpendicular to an extension direction of the magnet stack. By this, too, the configuration can be maintained compact. The accommodating section is preferably formed by the ferromagnetic elements or non-magnetic elements of the magnet stack. Thereby, adverse effects of the magnetic field and by the magnetic field can be reduced.

The energy transmission mechanism can also be, for example, a pneumatic energy transmission mechanism. However, a hydraulic mechanism is preferred due to the incompressibility of the hydraulic oil.

The plurality of the force transmission means can also be connected in series with respect to the energy transmission mechanism, in particular the one pressure application means, wherein the spaces of the pressing cylinders can be coupled to each other in series. Thus, not each force transmission means has to be coupled with the pressure application means. The lines can rather be provided between the force transmission means. This renders the arrangement very compact, and the pressure application means can be arranged arbitrarily.

It is also possible to use, instead of a pressing cylinder, a pulling cylinder as a linear actuator for the pressure application means and/or the force transmission means.

Even if it is not represented in the figures, the magnet device can comprise a lever means which is couplable to the pump cylinder 51, in particular the movable section thereof. The lever means can be coupled to the movable section such that an operating force can be applied in a spaced apart manner from the axis of a direction of motion of the pump cylinder 51. The lever means preferably extends further away from a center of rotation than the axis of the direction of motion of the pump cylinder is arranged. The center of rotation can be provided at the housing, wherein the lever means is coupled in a rotatory manner with the housing. The coupling to the pump cylinder is preferably effected in such a way that a rotation of the lever means permits a linear movement of the movable section. Thus, a large operating force can be easily applied. Furthermore, the pressure application means can also be a pump, such as a wing pump, instead of the hydraulic cylinder.

The above energy transmission mechanism can furthermore include a fluid storage means which is coupled with the pressure application means and/or the force transmission means in fluid communication. Thus, a better control of the amount of fluid in the energy transmission mechanism can be achieved. Furthermore, the pressure application means can, for example, repeatedly apply the pressure by providing fluid from the fluid storage means. Moreover, the energy transmission mechanism can be protected from damages by discharging fluid to the fluid storage means, for example in case of excessive pressure in the force transmission means. To this end, the energy transmission mechanism preferably includes a pressure relief valve which couples at least one section of the operating channel with the fluid storage means.

Furthermore, the energy transmission mechanism 5 can comprise a valve means which is arranged to prevent a transfer of the at least one magnet stack 4 towards the interaction position. Thus, a throttle valve can be arranged in the operating path or the tracking path, wherein, when the throttle is closed, a movement of the fluid is prevented, and thus the position of the magnet stack is maintained. The valve can also be a check valve.

The valve means, however, can also include a multi-way valve, for example. If a fluid storage means is provided, a path of the valve can couple the force transmission means with the pressure application means, while another path can couple the force transmission means with the fluid storage means. If switching is accomplished from the one path to the other path, the pressure in the force transmission means is maintained.

Furthermore, the hydraulic cylinders do not have to be embodiments acting on both sides. A hydraulic cylinder acting on one side is also conceivable, wherein then, only the operating path is formed and the lines 53*b* are omitted.

Furthermore, the fluid-driven energy transmission mechanism can be coupled with a plurality of magnet stacks which can be arranged in series or parallel.

If large magnetic forces are required to fix a formwork in its position, a plurality of magnet stacks are usually provided. While according to prior art, each magnet stack has to be lifted individually with a tool, according to this aspect, a plurality of magnets can be simultaneously lifted by the energy transmission mechanism. Thus, time for the arrangement of the formworks can be saved and the configuration can be facilitated.

Preferably, the plurality of magnet stacks are arranged in parallel with respect to the fluid-driven energy transmission mechanism.

Here, the plurality of magnet stacks can be reliably and uniformly lifted, in particular with the same pressure. Furthermore, malfunctions in individual fluid branches cannot hazard the function of other fluid branches, so that individual magnet stacks can be reliably lifted.

A further aspect of the invention is directed to a method in which at least one magnet stack is at least partially transferred by means of a fluid-driven energy transmission mechanism from the interaction position into the release position.

In the present disclosure, "at least" also comprises the respective totality, if nothing else is taught by the disclosure.

LIST OF REFERENCE NUMERALS

1 system
2 switchable magnet device
3 housing
4 magnet stack
5 hydraulic mechanism (energy transmission mechanism)
51 pump cylinder (pressure application means)
52 pressing cylinder (force transmission means)
53*a*, 53*b* lines
54 knob
6 stationary section
7 magnet activation means
71 threaded rod
72 knob
8 release support means
81 hollow-cylindrical element
9 bushing

The invention claimed is:

1. A switchable magnet device, comprising:

at least one magnet stack that can be transferred between an interaction position in which the at least one magnet stack is magnetically functionally connected to a formwork support, and a release position in which the magnetically functional connection between the formwork support and the at least one magnet stack is reduced;

the at least one magnet device furthermore comprising a fluid-driven energy transmission mechanism that is coupled to the at least one magnet stack in order to transmit a force to the at least one magnet stack for at least partially transferring the at least one magnet stack from the interaction position into the release position;

wherein the at least one magnet stack includes at least one accommodating section formed at least in the interaction position of the magnet stack which accommodates at least a portion of the fluid-driven energy transmission mechanism within the at least one accommodating section.

2. The switchable magnet device according to claim 1, wherein the fluid-driven energy transmission mechanism is a hydraulic mechanism.

3. The switchable magnet device according to claim 1, wherein the fluid-driven energy transmission mechanism comprises at least one pressure application means for energy input into fluid of the fluid-driven energy transmission mechanism.

4. The switchable magnet device according to claim 1, wherein the fluid-driven energy transmission mechanism comprises at least one force transmission means which is coupled with the at least one magnet stack for transmitting force for at least partially transferring the at least one magnet stack from the interaction position into the release position.

5. The switchable magnet device according to claim 4, wherein the at least one force transmission means includes a fixed section and a movable section which is coupled to the at least one magnet stack for transferring the at least one magnet stack between the interaction position and the release position, and/or the force transmission means is at least partially structured to be arranged between the formwork support and an upper edge of the at least one magnet stack as seen in a direction perpendicular and/or parallel to the formwork support, and/or a coupling site of a fixed section of the force transmission means is structured to be arranged closer to the formwork support than a coupling site to the at least one magnet stack of a movable section of the force transmission means.

6. The switchable magnet device according to claim 4, wherein a plurality of the force transmission means are coupled with the at least one magnet stack.

7. The switchable magnet device according to claim 3, wherein the energy transmission mechanism furthermore includes a fluid storage means which is coupled with the pressure application means and/or the force transmission means in fluid communication.

8. The switchable magnet device according to claim 1, wherein the energy transmission mechanism furthermore comprises a valve which is arranged to prevent a transfer of the at least one magnet stack towards the interaction position.

9. The switchable magnet device according to claim 1, wherein the fluid-driven energy transmission mechanism is coupled with a plurality of the at least one magnet stack.

10. The switchable magnet device according to claim 9, wherein the plurality of the at least one magnet stack is arranged in parallel with respect to the fluid-driven energy transmission mechanism.

11. The switchable magnet device according to claim 1, wherein the further comprising a magnet stack activation means which is couplable with the at least one magnet stack at least for a transfer from the release position into the interaction position.

12. The switchable magnet device according to claim 1, wherein the further comprising at least one release support means which is configured to support a transfer of the at least one magnet stack into the release position.

13. The switchable magnet device according to claim 1, wherein:

the accommodating section is formed to extend in parallel to the formwork support, and/or the accommodating section comprises a recess which is provided on a side of the at least one magnet stack facing the formwork support.

14. A system comprising:

the switchable magnet device according to claim 1, and a housing that at least partially receives the switchable magnet device within the housing.

15. The system according to claim 14, further comprising at least one limit stop which defines the interaction position independent of the fluid-driven energy transmission mechanism.

16. The system according to claim 14, wherein:

the fluid-driven energy transmission mechanism comprises at least one pressure application means for energy input into fluid of the fluid-driven energy transmission mechanism; and at least a section of the pressure application means is accessible from outside the housing.

17. The switchable magnetic device according to claim 1, wherein the formwork support is magnetisable.

* * * * *